United States Patent
Dixit et al.

(10) Patent No.: US 9,483,435 B2
(45) Date of Patent: Nov. 1, 2016

(54) USB TRANSCEIVER (71) Applicants: Ravi Dixit, Ghaziabad (IN); Parul K. Sharma, Noida (IN)

(72) Inventors: Ravi Dixit, Ghaziabad (IN); Parul K. Sharma, Noida (IN)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 383 days.

(21) Appl. No.: 14/324,234

(22) Filed: Jul. 6, 2014

(65) Prior Publication Data

US 2016/0004661 A1 Jan. 7, 2016

(51) Int. Cl.
*G06F 13/42* (2006.01)
*G06F 13/00* (2006.01)
*G06F 1/26* (2006.01)
*G06F 13/38* (2006.01)
*G06F 13/40* (2006.01)

(52) U.S. Cl.
CPC ............ *G06F 13/4221* (2013.01); *G06F 1/266* (2013.01); *G06F 13/385* (2013.01); *G06F 13/409* (2013.01)

(58) Field of Classification Search
USPC .................. 710/301–304, 104–110, 306–315
See application file for complete search history.

(56) References Cited

U.S. PATENT DOCUMENTS

| 6,990,549 | B2 * | 1/2006 | Main | G06F 13/4045 361/679.4 |
|---|---|---|---|---|
| 7,747,807 | B2 | 6/2010 | Komatsu et al. | |
| 8,166,222 | B2 * | 4/2012 | Garlapati | G06F 13/4072 326/62 |
| 8,228,095 | B2 | 7/2012 | Inoue | |
| 8,683,091 | B2 * | 3/2014 | Chen | G06F 11/3051 710/17 |
| 2014/0006664 | A1 * | 1/2014 | Chen | G06F 13/4072 710/106 |
| 2015/0067209 | A1 * | 3/2015 | Liu | H03K 5/22 710/106 |

OTHER PUBLICATIONS

McGowan, Steve, USB 2.0 Transceiver Macrocell Interface (UTMI) Specification, Version 1.05, Mar. 29, 2001.
UTMI+ Specification, Revision 1.0, Feb. 25, 2004.

* cited by examiner

*Primary Examiner* — Raymond Phan
(74) *Attorney, Agent, or Firm* — Charles E. Bergere

(57) ABSTRACT

A Universal Serial Bus (USB) controller includes a USB transceiver to detect a high-speed (HS) disconnect between the USB controller and a device connected to it. The USB transceiver includes a reference-voltage generation circuit, a HS current driver, first and second comparators, and a multiplexer. The reference-voltage generation circuit generates HS disconnect and transmitter reference-voltage signals that have a constant voltage difference. The first comparator receives DP and DM signals that correspond to a HS Start of Frame (SOF) packet during HS disconnect detection, and generates a control voltage. The multiplexer outputs at least one of the DP and DM signals based on the logic state of the control voltage. The second comparator receives the selected signal and the HS disconnect reference-voltage signal, and outputs a HS disconnect output voltage signal when the selected signal is greater than the HS disconnect reference-voltage signal.

16 Claims, 4 Drawing Sheets

USB TRANSCEIVER

BACKGROUND OF THE INVENTION

The present invention relates generally to data communications, and, more particularly, to a Universal Serial Bus (USB) transceiver for a USB controller circuit.

Universal Serial Bus (USB) is a standard for serial interfaces that defines communications between devices such as personal computers (referred to as a USB host) and input/output (I/O) devices such as keyboards, printers, storage, and imaging devices. Various versions of the USB standard have been introduced by the USB-Implementers Forum (USB-IF) including USB 1.0 and USB 2.0. The USB 1.0 standard defines low speed (LS) and full speed (FS) data transfer modes that support data transfer rates of 1.5 megabit per second (Mbps) and 12 Mbps, respectively. The USB 2.0 standard defines a high speed (HS) data transfer mode that supports a data transfer rate of 480 Mbps and is backward compatible, i.e., supports the LS and FS data transfer modes as well. A USB host includes a USB interface that connects the USB host to the devices and is referred to as a host or USB controller. The USB controller includes a USB transceiver that facilitates data communication between the USB controller and the connected devices.

Figure 1:
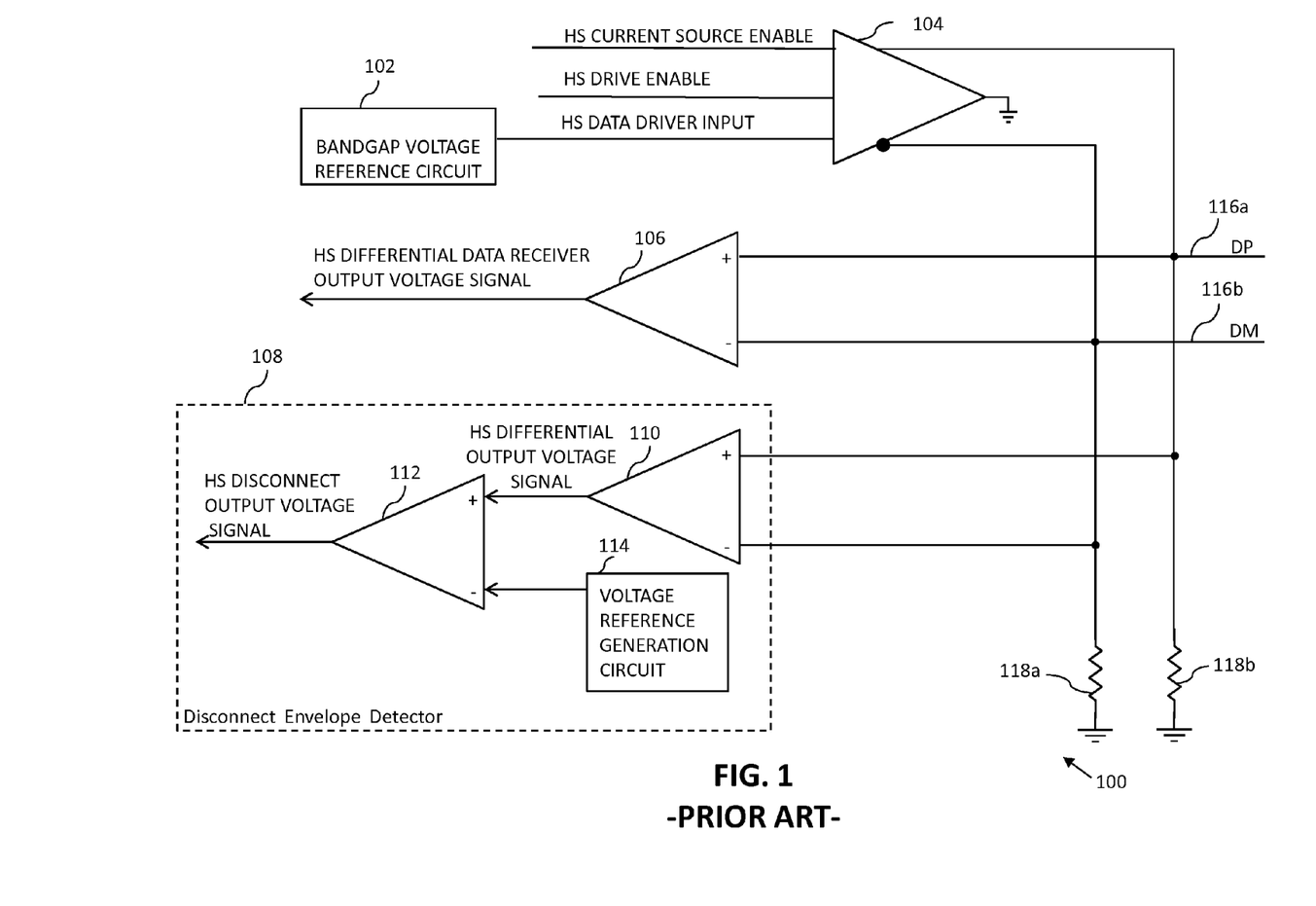
FIG. 1 is a schematic block diagram of a conventional USB transceiver that includes a high-speed (HS) disconnect detection circuit.

FIG. 1 is a schematic block diagram of a USB 2.0 transceiver 100. The USB transceiver 100 includes a bandgap voltage reference circuit 102, a HS current driver 104, a HS differential data receiver (HSRx) 106, and a disconnect envelope detector 108. The disconnect envelope detector 108 includes first and second comparators 110 and 112, and a voltage reference generation circuit 114. The USB transceiver 100 couples to a USB device (not shown) by way of a pair of differential signaling data lines (referred to as DP and DM lines) 116a and 116b for transfer of data signals (referred to as DP and DM signals). The DP and DM lines 116a and 116b are connected to ground by way of pull-down resistors 118a and 118b.

The bandgap voltage reference circuit 102 generates a transmitter reference-voltage signal that conforms to the USB 2.0 transmitter eye specification and that is in the range of 300 millivolts (mV) to 525 mV. The HS current driver 104 has HS current source enable (HCSE), HS drive enable (HDE), HS data driver input (HDDI) terminals. The HCSE and HDE terminals are control terminals that enable the HS current driver 104 and an internal current source, respectively. The HDDI terminal is connected to the bandgap voltage reference circuit 102 for receiving the transmitter reference-voltage signal. The HS current driver 104 has first and second output terminals connected to the DP and DM lines 116a and 116b, respectively. A current from the internal current source is directed to the DP and DM lines 116a and 116b by way of the first and second output terminals, respectively. The HSRx 106 has non-inverting and inverting terminals connected to the DP and DM lines 116a and 116b, respectively, for receiving the DP and DM signals from the connected USB device and an output terminal that outputs an HSRx output voltage signal. The first comparator 110 of the disconnect envelope detector 108 has non-inverting and inverting terminals connected to the DP and DM lines 116a and 116b for receiving the DP and DM signals and an output terminal for outputting a HS differential output voltage signal. The second comparator 112 has a non-inverting terminal connected to the output terminal of the first comparator 110 for receiving the HS differential output voltage signal, an inverting terminal connected to the voltage reference generation circuit 114 for receiving a disconnect reference-voltage signal, and an output terminal for outputting a HS disconnect output voltage signal. The disconnect envelope detector 108 detects disconnect between the USB controller and the USB device.

In operation, when the USB controller is connected to the USB device, a special data packet referred to as a Start Of Frame (SOF) packet is transmitted by the HS current driver 104 at a time interval of 125 microseconds during transmission of the DP and DM signals. An End Of Packet (EOP) of a HS SOF packet has a length of 40 bits and includes 5 Non-Return-To-Zero (NRZI) bytes. The 5 NRZI bytes correspond to a logic high state of at least one of the DP and DM lines 116a and 116b that transmits the SOF packet for the length of 40 bits. When the DP and DM lines 116a and 116b are at logic high and low states, respectively, this is referred to as a differential logic high state, and when the DP and DM lines 116a and 116b are at logic low and high states, respectively, this state is referred to as a differential logic low state. When the DP and DM lines 116a and 116b both are low, the data lines are in a single-ended-zero (SE0) state. In the USB 2.0 standard, the differential logic high and low states of the DP and DM lines 116a and 116b are referred to as J and K states, respectively. The disconnect detection between the USB controller and the USB device occurs during the transmission of the EOP of the SOF.

The current that flows in the DP and DM lines 116a and 116b has a value of 17.78 milliamperes (mA). When the HCSE terminal receives a logic high signal, the 17.78 mA current is directed to at least one of the DP and DM lines 116a and 116b. The resistors 118a and 118b have a resistance value of 45 ohms. Resistors of the resistance value 45 ohms are also connected to the DP and DM lines 116a and 116b at the USB device side. When the USB controller is connected to the USB device, an effective load resistance on each side is 22.5 ohms (45 ohms∥45 ohms).

When the USB controller is connected to the USB device and the DP and DM lines 116a and 116b, are at the J state, i.e., when the 17.78 mA current flows in the DP line, the HS differential output voltage signal at a voltage level of 400 mV (17.78 mA*22.5 ohms) is obtained at the output terminal of the first comparator 110. When the USB controller is connected to the USB device and the DP and DM lines 116a and 116b are at the K state, i.e., when the current of 17.78 mA flows in the DM line, the HS differential output voltage signal at a voltage level of −400 mV (17.78 mA*22.5 ohms) is obtained at the output terminal of the first comparator 110. However, when there is a disconnect between the USB controller and the USB device, the 17.78 mA current flows by way of at least one of the resistors 118a and 118b due to the absence of the resistors on the USB device side, resulting in the HS differential output voltage signal of a voltage level of 800 mV (17.78 mA*45 ohms), which is twice the HS differential output voltage signal voltage level when the USB controller and the USB device are connected.

The USB 2.0 standard specifies a disconnect eye specification that ranges from 525 mV to 625 mV. The voltage reference circuit 114 generates the disconnect reference-voltage signal and the second comparator 112 compares the HS differential output voltage signal with the disconnect reference-voltage signal and generates the HS disconnect output voltage signal. The HS disconnect output voltage signal is at logic high state if the voltage level of the HS differential output voltage signal exceeds a voltage level of the disconnect reference-voltage signal. Thus, when the HS differential output voltage signal is at 800 mV i.e., beyond the transmitter and disconnect eye specifications, the HS disconnect output voltage signal is generated at logic high state. The HS disconnect output voltage signal is not generated if the HS differential output voltage signal is less than 525 mV. However, when the HS differential output voltage signal exceeds 625 mV, the HS disconnect output voltage signal goes high.

The HS disconnect envelope detector 108 further includes a voltage-to-current converter circuit (not shown) that converts the HS differential output voltage and disconnect reference-voltage signals to current equivalent signals. The current equivalent of the HS differential output voltage signal is compared with the current equivalent of the disconnect reference-voltage signal. Additional circuitry such as the voltage-to-current converter for the disconnect detection results in an area overhead of the USB controller. Also, the disconnect envelope detector 108 is a differential comparator and requires multiple reference-voltage signals to perform such a comparison. Thus, there are more variations in the comparison result of the disconnect envelope detector 108, resulting in a large spread of the disconnect reference-voltage signal.

There is less noise margin available between the disconnect eye specification and the transmitter eye specification of the USB 2.0 standard. A small amount of noise in the USB controller can falsely trigger the disconnect envelope detector 108 to generate the HS disconnect output voltage signal. As a result, the USB controller receives a false disconnect indication.

Therefore, it would be advantageous to have a USB transceiver that includes a disconnect envelope detector that causes reduced variation in a disconnect reference-voltage signal, and maintains a constant gap between the disconnect reference-voltage signal and the transmitter reference-voltage signal.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE PRESENT INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein, the term multiplexer has been abbreviated as a mux.

In an embodiment of the present invention, a Universal Serial Bus (USB) transceiver for a USB controller is provided. The USB transceiver detects a HS disconnect between the USB controller and a device connected thereto. The USB transceiver comprises a reference-voltage generation circuit, a current driver, first and second comparators, and a first multiplexer. The reference-voltage generation circuit generates a HS disconnect reference-voltage signal and a transmitter reference-voltage signal. The HS disconnect and transmitter reference-voltage signals have a constant voltage difference therebetween. The current driver has an input terminal connected to the reference-voltage generation circuit for receiving the transmitter reference-voltage signal, and first and second output terminals for outputting first and inverted first voltage signals, respectively. The first comparator has first and second input terminals connected to the first and second output terminals of the current driver for receiving the first and inverted first voltage signals, respectively, and an output terminal for outputting a control voltage signal. The multiplexer has first and second input terminals connected to the first and second output terminals of the current driver for receiving the first and inverted first voltage signals, respectively, a select input terminal connected to the output terminal of the first comparator for receiving the control voltage signal, and an output terminal for outputting one of the first and inverted first voltage signals. The second comparator has a first input terminal connected to the output terminal of the multiplexer for receiving the selected one of the first and inverted first voltage signals, a second input terminal connected to the reference-voltage generation circuit for receiving the HS disconnect reference-voltage signal, and an output terminal for outputting a HS disconnect output voltage signal when the selected one of the first and inverted first voltage signals is greater than the HS disconnect reference-voltage signal, thereby detecting the HS disconnect between the USB controller and the device.

In another embodiment of the invention, a Universal Serial Bus (USB) transceiver for a USB controller is provided. The USB transceiver detects a HS disconnect between the USB controller and a device connected thereto. The USB transceiver comprises a reference-voltage generation circuit, a current driver, first and second comparators, first and second multiplexers, and a register. The reference-voltage generation circuit generates a HS disconnect reference-voltage signal and a transmitter reference-voltage signal. The HS disconnect and transmitter reference-voltage signals have a constant voltage difference therebetween. The current driver has an input terminal connected to the reference-voltage generation circuit for receiving the transmitter reference-voltage signal, and first and second output terminals for outputting first and inverted first voltage signals, respectively. The first comparator has first and second input terminals connected to the first and second output terminals of the current driver for receiving the first and inverted first voltage signals respectively, and an output terminal for outputting a control voltage signal. The first multiplexer has first and second input terminals connected to the first and second output terminals of the current driver for receiving the first and inverted first voltage signals, respectively, a select input terminal connected to the output terminal of the first comparator for receiving the control voltage signal, and an output terminal for outputting a selected one of the first and inverted first voltage signals. The register stores first and second mode select bits and outputs first and second mode select voltage signals. The second multiplexer has a first input terminal connected to the output terminal of the first multiplexer for receiving the selected one of the first and inverted first voltage signals, second and third input terminals connected to the first and second output terminals of the current driver, for receiving the first and inverted first voltage signals, respectively, a fourth input terminal connected to ground, first and second select input terminals connected to the register for receiving the first and second mode select voltage signals, respectively, and an output terminal for outputting a selected one of the first and inverted first voltage signals and a logic low voltage signal as a selected voltage signal. The second comparator has a first input terminal connected to the output terminal of the second multiplexer for receiving the selected voltage signal, a second input terminal connected to the reference-voltage generation circuit for receiving the HS disconnect reference-voltage signal, and an output terminal for outputting a HS disconnect output voltage signal when the selected voltage signal is greater than the HS disconnect reference-voltage signal, thereby detecting the HS disconnect between the USB controller and the device.

Various embodiments of the present invention provide a Universal Serial Bus (USB) transceiver for a USB controller. The USB transceiver detects a HS disconnect between the USB controller and a device connected thereto. The transceiver includes a reference-voltage generation circuit, a current driver, first and second comparators, first and second multiplexers, and a register. The reference-voltage generation circuit generates a transmitter reference-voltage signal and a HS disconnect reference-voltage signal. The first comparator receives first and inverted first voltage signals and outputs a control voltage signal. The first multiplexer selects and outputs one of the first and inverted first voltage signals based on the control voltage signal to a first input terminal of the second multiplexer. The second multiplexer receives the selected one of the first and inverted first voltage signals at second and third input terminals thereof. A fourth input terminal of the second multiplexer is connected to ground. The second multiplexer selects one of the first and inverted first voltage signals based on first and second mode select voltage signals received from a register of the USB transceiver. The selected voltage signal is provided to the second comparator, which compares the selected voltage signal with a HS disconnect reference-voltage signal and outputs a HS disconnect output voltage signal. Thus, only one of the inputs to the first comparator is used to determine the HS disconnect between the USB controller and the device. Thus, the HS disconnect is determined independent of a HS differential signal. As a result, the second comparator of the USB transceiver of the present invention, which corresponds to a disconnect comparator, provides a low spread of the HS disconnect reference-voltage signal. The absence of additional circuitry such as a voltage-to-current converter for the HS disconnect detection reduces area overhead. Moreover, the reference-voltage generation circuit maintains a constant voltage gap between the transmitter reference-voltage signal and the HS disconnect reference-voltage signal. Thus, a false HS disconnect output voltage signal due to noise is not generated by the disconnect comparator.

Figure 2A:
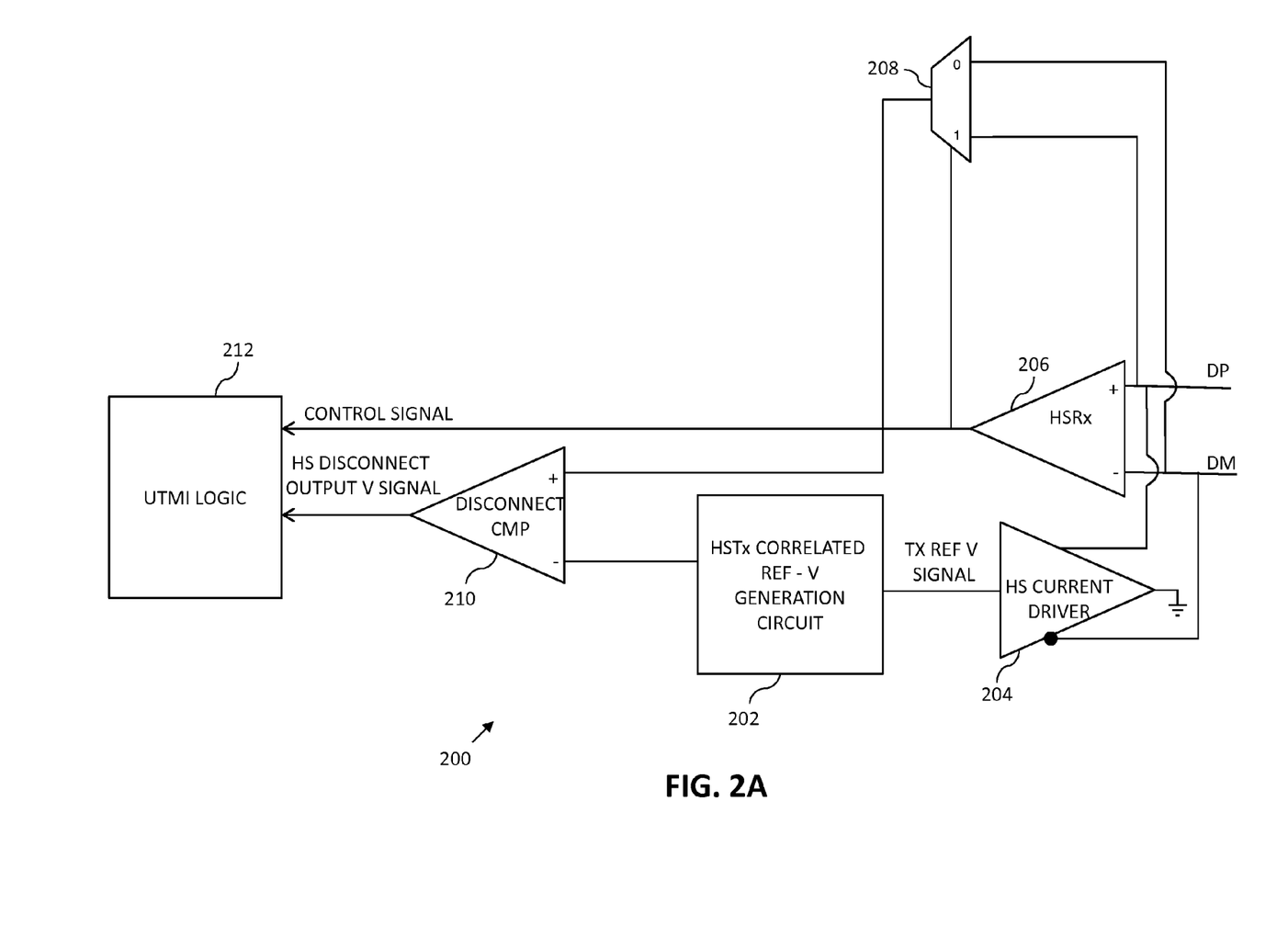
FIG. 2A is a schematic block diagram of a USB transceiver that includes a HS disconnect detection circuit in accordance with an embodiment of the present invention.

Referring now to FIG. 2A, a schematic block diagram of a Universal Serial Bus (USB) transceiver 200 of a USB controller (not shown) in accordance with an embodiment of the present invention is shown. The USB transceiver 200 includes a high-speed (HS) transmitter (HSTx) correlated reference-voltage generation circuit 202, a HS current driver 204, a HS differential data receiver (HSRx) 206, a first multiplexer or first mux 208, a HS disconnect comparator 210, and a USB Transceiver Macrocell Interface (UTMI) 212.

The HSTx correlated reference-voltage generation circuit 202 generates a transmitter reference-voltage signal and a HS disconnect reference-voltage signal. The HS current driver 204 has an input terminal connected to the HSTx correlated reference-voltage generation circuit 202 for receiving the transmitter reference-voltage signal, and first and second output terminals for outputting first and inverting first voltage signals, referred to as DP and DM signals or differential data signals. The HSRx 206 has first and second input terminals connected to the first and second output terminals of the HS current driver 204 for receiving the DP and DM signals, respectively, and an output terminal for outputting a control signal based on the DP and DM signals. The HSRx 206 generally receives the DP and DM signals from a USB device (not shown). However, during the transmission of a Start Of Frame (SOF) packet, the HSRx 206 receives the DP and DM signals from the HS current driver 204. The control signal is a differential output signal. The first mux 208 is a 2:1 mux and has first and second input terminals connected to the first and second output terminals of the HS current driver 204 for receiving the DP and DM signals, respectively, a select terminal connected to the output terminal of the HSRx 206 for receiving the control signal and an output terminal for outputting one of the DP and DM signals. The HS disconnect comparator 210 has a first input terminal connected to the output terminal of the first mux 208 for receiving the selected one of the DP and DM signals, a second input terminal connected to the HSTx correlated reference-voltage generation circuit 202 for receiving the HS disconnect reference-voltage signal, and an output terminal for outputting a HS disconnect output voltage signal. In an embodiment of the present invention the HS disconnect comparator 210 is a low-offset comparator. The UTMI 212 is connected to the HSTx correlated reference-voltage generation circuit 202 for receiving the HS disconnect output voltage signal. The UTMI 212 performs functions such as data serialization and de-serialization, data validity signaling, and HS detection handshaking based on the HS disconnect output voltage signal.

The USB controller is connected to the USB device by way of a four wire cable that includes two data lines, (referred to as DP and DM lines). The HSTx correlated reference-voltage generation circuit 202 generates a transmitter reference-voltage signal, which is received by the HS current driver 204. When the HS current driver 204 receives the transmitter reference-voltage signal, the HS current driver 204 generates the DP and DM signals at a voltage level of the transmitter reference-voltage signal. The transmitter reference-voltage signal conforms to a transmitter eye specification of the USB 2.0 standard and ranges from 300 millivolts (mV) to 525 mV. The DP and DM signals correspond to an End Of Packet (EOP) of the SOF packet. The SOF packet is a special packet transmitted by the USB transceiver 200 every 125 microseconds in a frame of packets to the USB device. A disconnect detection between the USB controller and the USB device is performed during the transmission of the EOP of the SOF packet.

In operation, when the DP line is at a logic high state, and the DM line is at a logic low state, the HSRx 206 outputs the control signal at a logic high state. The logic high control signal causes the first mux 208 to output the DP signal. The first input terminal of the HS disconnect comparator 210 receives the DP signal. The HS disconnect comparator 210 compares the DP signal with the disconnect reference-voltage signal. The HS disconnect reference-voltage signal ranges from 525 mV to 625 mV while the DP signal ranges from 300 mV to 525 mV. If the DP signal is at a voltage level greater than that of the HS disconnect reference-voltage signal (625 mV), the HS disconnect output voltage signal is at logic high state indicating the UTMI 212 that a disconnect between the USB controller and the USB device has occurred. If the DP signal is at a voltage level less than that of the HS disconnect reference-voltage signal (525 mV), the HS disconnect output voltage signal is at logic low state indicating the UTMI 212 that the USB controller is connected to the USB device.

When the DP line is at logic low state and the DM line is at logic high state, the HSRx 206 outputs the control signal at logic low state. The logic low control signal causes the first mux 208 to output the DM signal. The first input terminal of the HS disconnect comparator 210 receives the DM signal. The HS disconnect comparator 210 compares the DM signal with the disconnect reference-voltage signal. If the DM signal is at a voltage level greater than that of the HS disconnect reference-voltage signal, the HS disconnect comparator 210 is at the logic high state indicating the UTMI 212 that the disconnect between the USB controller and the USB device has occurred. If the DM signal is at a voltage level less than that of the HS disconnect reference-voltage signal, the HS disconnect output voltage signal is at logic low state indicating the UTMI 212 that the USB controller is connected to the USB device.

Figure 2B:
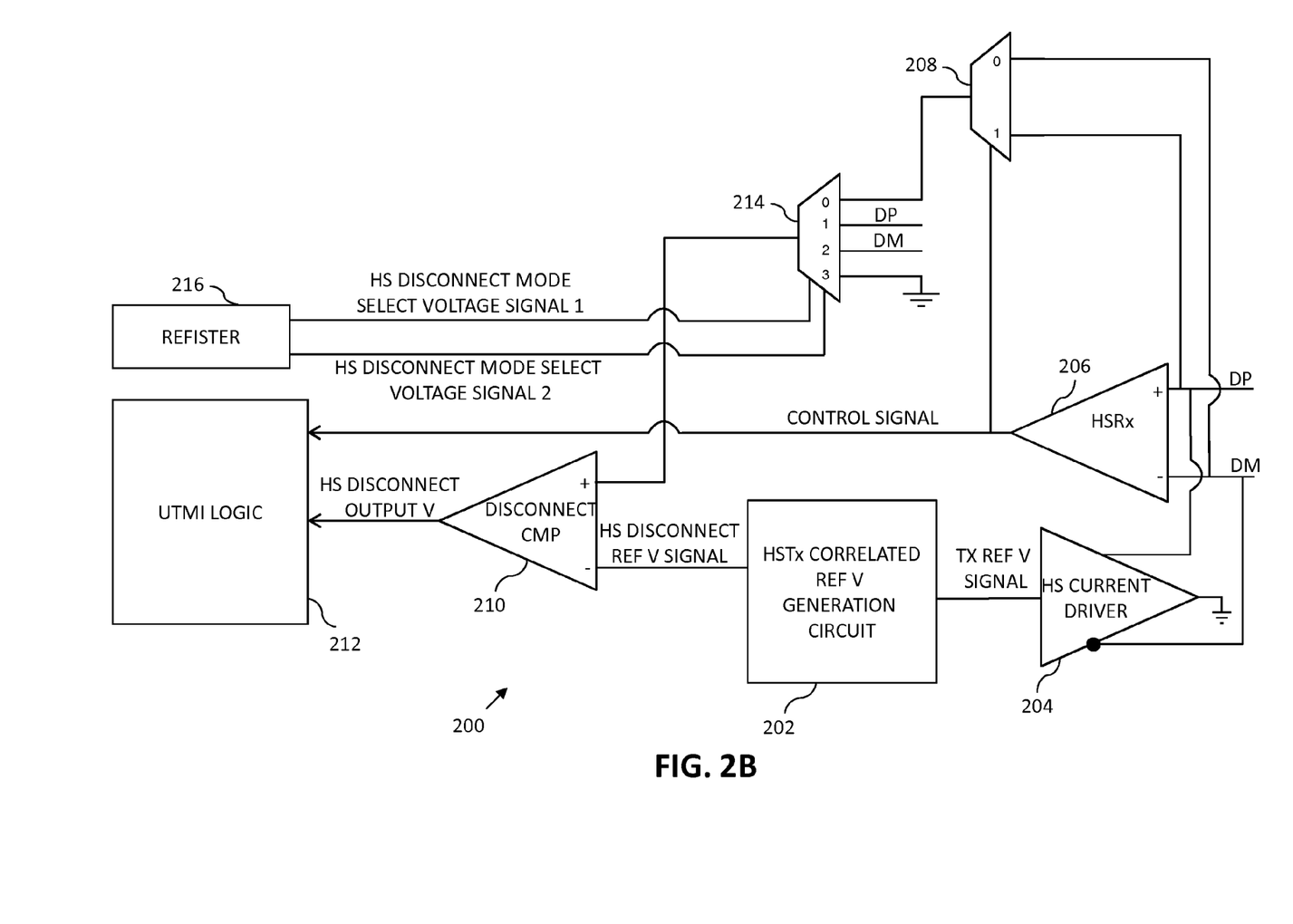
FIG. 2B is a schematic block diagram of a USB transceiver that includes a HS disconnect detection circuit in accordance with another embodiment of the present invention.

FIG. 2B shows an alternate implementation of the USB transceiver 200 of FIG. 2A. The USB transceiver 200 includes the HSTx correlated reference-voltage generation circuit 202, the HS current driver 204, the HSRx 206, the first mux 208, the HS disconnect comparator 210, the UTMI 212, a second mux 214, and a register 216.

In an embodiment, the second mux 214 is a 4:1 mux. The second mux 214 has a first input terminal connected to the output terminal of the first mux 208 for receiving at least one of the DP and DM signals. The second mux 214 has second and third input terminals connected to the first and second output terminals of the HS current driver 204 for receiving the DP and DM signals, respectively. A fourth terminal of the second mux 214 is connected to ground. The register 216 stores HS disconnect mode select values (preferably in the form of binary digits) that determine a mode of operation of the USB transceiver 200. First and second select lines of the second mux 214 receive the HS disconnect mode select values from the register 216 as first and second HS disconnect mode select voltage signals, respectively. The first input terminal of the HS disconnect comparator 210 is connected to the output terminal of the second mux 214 for receiving at least one of the DP and DM signals.

When the DP signal is at logic high state, the first mux 208 outputs the DP signal. When the DM signal is at logic high state, the first mux 208 outputs the DM signal. The first input terminal of the second mux 214 receives at least one of the DP and DM signals from the first mux 208 based on the state of the control signal. When both the first and second HS disconnect mode select voltage signals are at logic low state, the second mux 214 outputs at least one of the DP and DM signals. When the first and second HS disconnect mode select voltage signals are at logic low and high states, respectively, the second mux 214 outputs the DP signal. When the first and second HS disconnect mode select voltage signals are at logic high and low states, respectively, the second mux 214 outputs the DM signal. When the first and second HS disconnect mode select voltage signals are at logic high state, the second mux 214 outputs a disconnect mask signal which is a logic low signal. The disconnect mask signal masks the disconnect detection operation between the USB controller and the USB device. The HS disconnect comparator 210 compares the output of the second mux 214 with the disconnect reference-voltage signal. When the second mux 214 outputs the DP signal, the HS disconnect comparator 210 compares the DP signal with the disconnect reference-voltage signal. If the DP signal is at a voltage level greater than that of the HS disconnect reference-voltage signal, the HS disconnect output voltage signal is at logic high state indicating the UTMI 212 that disconnect between the USB controller and the USB device has occurred. If the DP signal is at a voltage level less than that of the HS disconnect reference-voltage signal, the HS disconnect output voltage signal is at logic low state indicating the UTMI 212 that the USB controller is connected to the USB device. When the second mux 214 outputs the DM signal, the HS disconnect comparator 210 compares the DM signal with the disconnect reference-voltage signal. If the DM signal is at a voltage level greater than that of the HS disconnect reference-voltage signal, the HS disconnect output voltage signal is at logic high state indicating the UTMI 212 that disconnect between the USB controller and the USB device has occurred. If the DM signal is at a voltage level less than that of the HS disconnect reference-voltage signal, the HS disconnect output voltage signal is at logic low state indicating the UTMI 212 that the USB controller is connected to the USB device.

Figure 3:
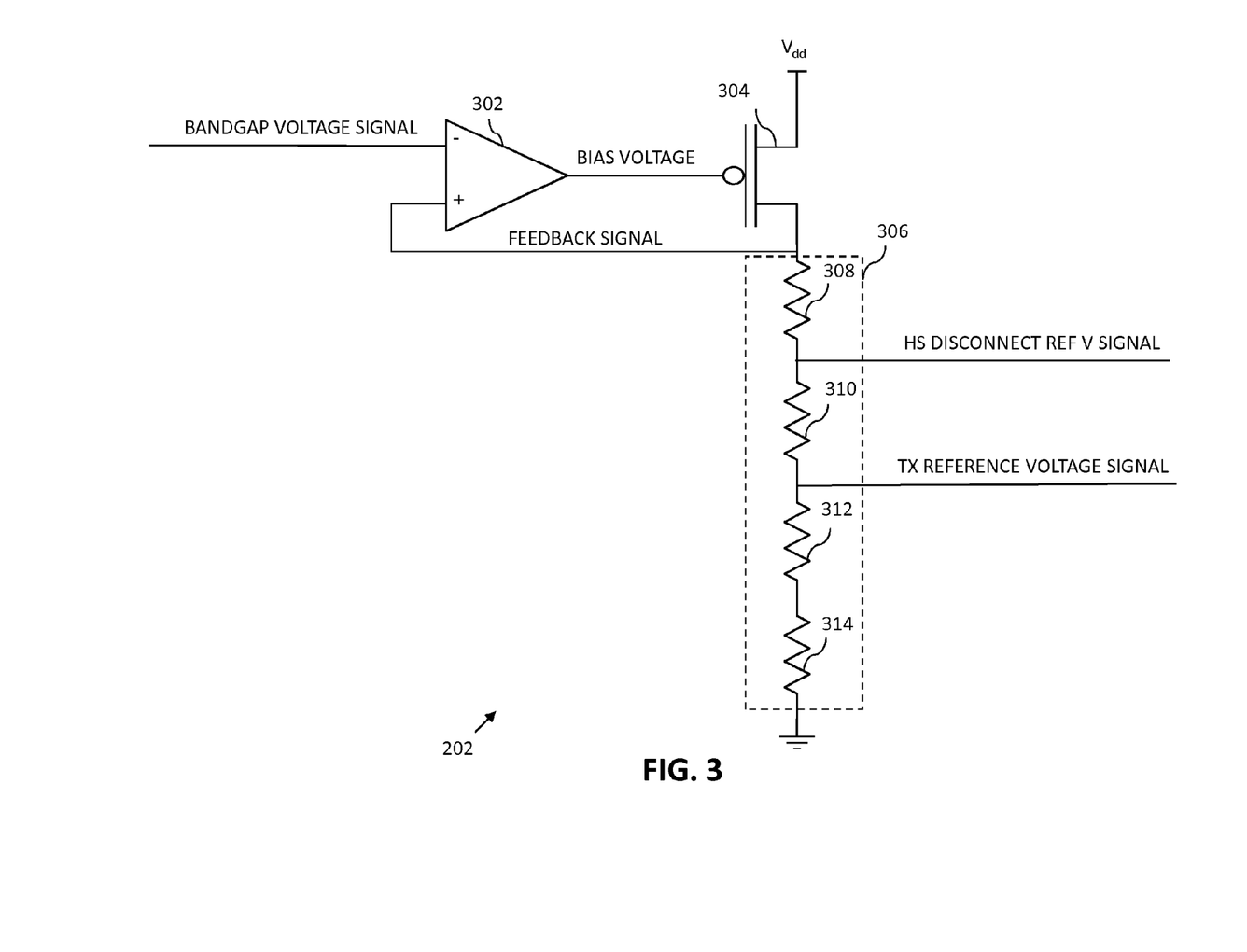
FIG. 3 is a schematic block diagram of a HS transmitter correlated reference-voltage generation circuit in accordance with an embodiment of the present invention.

Referring now to FIG. 3, a schematic block diagram of the HSTx correlated reference-voltage generation circuit 202 in accordance with an embodiment of the present invention is shown. The HSTx correlated reference-voltage generation circuit 202 includes an operational amplifier 302, a transistor 304, and a resistor-ladder network 306. The operational amplifier 302 has an inverting input terminal that receives a bandgap voltage signal, a non-inverting input terminal connected to the resistor-ladder network 306 that receives a feedback signal, and an output terminal that outputs a bias voltage signal. The output terminal of the operational amplifier 302 is connected to a gate terminal of the transistor 304. The transistor 304 has a source terminal connected to a supply voltage source (not shown) for receiving a supply voltage ($V_{dd}$) and a drain terminal connected to the resistor-ladder network 306. The resistor-ladder network 306 includes a plurality of resistors including first through fourth resistors 308-314 connected in series. A first node of the resistor-ladder network 306 is connected to the drain terminal of the transistor 304 and a second node thereof is connected to ground. A first terminal of the first resistor 308 is connected to the drain terminal of the transistor 304. A second terminal of the first resistor 308 is connected to a first terminal of the second resistor 310 to form a voltage tap 1. A second terminal of the second resistor 310 is connected to a first terminal of the third resistor 312 to form a voltage tap 2.

The HSTx correlated reference-voltage generation circuit 202 is essentially a bandgap voltage reference circuit, function of which is well known to those of skill in art. The HS disconnect reference-voltage signal is obtained at the voltage tap 1 and the transmitter reference-voltage signal is obtained at the voltage tap 2. As the HS disconnect reference-voltage signal and the transmitter reference-voltage signal are obtained from the same resistor-ladder network 306, a constant voltage gap is maintained between the voltage levels thereof. Any noise in the HSTx correlated reference-voltage generation circuit 202 affects both the transmitter and the HS disconnect reference-voltage signals, thereby ensuring that the transmitter reference-voltage signal does not exceed the HS disconnect reference-voltage signal. Thus, a false indication of disconnect between the USB controller and the USB device is not generated.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A Universal Serial Bus (USB) transceiver for a USB controller, wherein the USB transceiver detects a high-speed (HS) disconnect between the USB controller and a device connected to the USB controller, the USB transceiver comprising:
    a reference-voltage generation circuit for generating a HS disconnect reference-voltage signal and a transmitter reference-voltage signal, wherein the HS disconnect and transmitter reference-voltage signals have a constant voltage difference therebetween;
    a current driver having an input terminal connected to the reference-voltage generation circuit for receiving the transmitter reference-voltage signal, and first and second output terminals for outputting first and inverted first voltage signals, respectively;
    a first comparator having first and second input terminals connected to the first and second output terminals of the current driver for receiving the first and inverted first voltage signals, respectively, and an output terminal for outputting a control voltage signal;
    a multiplexer having first and second input terminals connected to the first and second output terminals of the current driver for receiving the first and inverted first voltage signals, respectively, a select input terminal connected to the output terminal of the first comparator for receiving the control voltage signal, and an output terminal for outputting a selected one of the first and inverted first voltage signals; and
    a second comparator having a first input terminal connected to the output terminal of the multiplexer for receiving the selected one of the first and inverted first voltage signals, a second input terminal connected to the reference-voltage generation circuit for receiving the HS disconnect reference-voltage signal, and an output terminal for outputting a HS disconnect output voltage signal when the selected one of the first and inverted first voltage signals is greater than the HS disconnect reference-voltage signal, thereby detecting the HS disconnect between the USB controller and the device.

2. The USB transceiver of claim 1, wherein the reference-voltage generation circuit comprises:
    a resistor-ladder network;
    a third comparator having a first input terminal for receiving a bandgap voltage signal, a second input terminal connected to the resistor-ladder network, and an output terminal for outputting a bias voltage signal; and
    a transistor having a gate terminal connected to the output terminal of the third comparator for receiving the bias voltage signal, a source terminal for receiving a supply voltage signal, and a drain terminal connected to the resistor-ladder network, wherein the drain terminal outputs the HS disconnect and transmitter reference-voltage signals, which are obtained from first and second voltage taps of the resistor-ladder network, respectively.

3. The USB transceiver of claim 1, wherein the first and second comparators comprise a HS data receiver and a low-offset comparator, respectively.

4. The USB transceiver of claim 1, wherein the multiplexer outputs the first voltage signal when the control voltage signal is at a logic high state and the inverted first voltage signal when the control voltage signal is at a logic low state.

5. The USB transceiver of claim 1, wherein the first and inverted first voltage signals correspond to an End of Packet (EOP) for a Start of Frame (SOF) packet conforming to the USB 2.0 standard.

6. The USB transceiver of claim 2, wherein the third comparator comprises an operational amplifier.

7. A Universal Serial Bus (USB) transceiver for a USB controller, the USB transceiver for detecting a high-speed (HS) disconnect between the USB controller and a device connected to the USB controller, the USB transceiver comprising:
    a reference-voltage generation circuit for generating a HS disconnect reference-voltage signal and a transmitter reference-voltage signal, wherein the reference-voltage generation circuit maintains a constant voltage difference between the HS disconnect and transmitter reference-voltage signals;
    a current driver having an input terminal connected to the reference-voltage generation circuit for receiving the transmitter reference-voltage signal, and first and second output terminals for outputting first and inverted first voltage signals, respectively;
    a first comparator having first and second input terminals connected to the first and second output terminals of the current driver for receiving the first and inverted first voltage signals, respectively, and an output terminal for outputting a control voltage signal;
    a first multiplexer having first and second input terminals connected to the first and second output terminals of the current driver, for receiving the first and inverted first voltage signals, respectively, a select input terminal connected to the output terminal of the first comparator for receiving the control voltage signal, and an output terminal for outputting one of the first and inverted first voltage signals;
    a register that stores first and second mode select bits and outputs first and second mode select signals;
    a second multiplexer having a first input terminal connected to the output terminal of the first multiplexer for receiving the selected one of the first and inverted first voltage signals, second and third input terminals connected to the first and second output terminals of the current driver for receiving the first and inverted first voltage signals, respectively, a fourth input terminal connected to ground, first and second select input terminals connected to the register for receiving the first and second mode select signals, respectively, and an output terminal for outputting one of the first and inverted first voltage signals, and a logic low voltage signal as a selected voltage signal; and
    a second comparator having a first input terminal connected to the output terminal of the second multiplexer for receiving the selected voltage signal, a second input terminal connected to the reference-voltage generation circuit for receiving the HS disconnect reference-voltage signal, and an output terminal for outputting a HS disconnect output voltage signal when the selected voltage signal is greater than the HS disconnect reference-voltage signal, thereby detecting the HS disconnect between the USB controller and the device.

8. The USB transceiver of claim 7, wherein the second multiplexer outputs one of the first and inverted first voltage signals output by the first multiplexer as the selected voltage signal when the first and second mode select signals are in a logic low state.

9. The USB transceiver of claim 7, wherein the second multiplexer outputs the first voltage signal as the selected voltage signal when the first and second mode select signals are at a logic low state and a logic high state, respectively.

10. The USB transceiver of claim 7, wherein the second multiplexer outputs the inverted first voltage signal as the selected voltage signal when the first and second mode select signals are at a logic high state and a logic low state, respectively.

11. The USB transceiver of claim 7, wherein the second multiplexer outputs the logic low voltage signal as the selected voltage signal when the first and second mode select signals are at a logic high state.

12. The USB transceiver of claim 7, wherein the reference-voltage generation circuit comprises:
 a resistor-ladder network;
 a third comparator having a first input terminal for receiving a bandgap voltage signal, a second input terminal connected to the resistor-ladder network, and an output terminal for outputting a bias voltage signal; and
 a transistor having a gate terminal connected to the output terminal of the third comparator for receiving the bias voltage signal, a source terminal for receiving a supply voltage signal, and a drain terminal connected to the resistor-ladder network, wherein the drain terminal outputs the HS disconnect and transmitter reference-voltage signals, which are obtained from first and second voltage taps of the resistor-ladder network, respectively.

13. The USB transceiver of claim 7, wherein the first and second comparators comprise a high-speed data receiver and a low-offset comparator, respectively.

14. The USB transceiver of claim 7, wherein the first multiplexer outputs the first voltage signal when the control voltage signal is at a logic high state and the inverted first voltage signal when the control voltage signal is at a logic low state.

15. The USB transceiver of claim 7, wherein the first and inverted first voltage signals correspond to an End of Packet (EOP) for a Start of Frame (SOF) packet conforming to USB 2.0 standard.

16. The USB transceiver of claim 12, wherein the third comparator comprises an operational amplifier.

* * * * *